US012591363B2

(12) United States Patent
Li et al.

(10) Patent No.: US 12,591,363 B2
(45) Date of Patent: Mar. 31, 2026

(54) MEMORY PROGRAMMING METHOD, MEMORY DEVICE, AND MEMORY SYSTEM

(71) Applicant: YANGTZE MEMORY TECHNOLOGIES CO., LTD., Wuhan (CN)

(72) Inventors: Yifan Li, Wuhan (CN); Yao Chen, Wuhan (CN); Zhiliang Xia, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/204,341

(22) Filed: May 31, 2023

(65) Prior Publication Data

US 2024/0295960 A1 Sep. 5, 2024

(30) Foreign Application Priority Data

Feb. 28, 2023 (CN) .......................... 202310186642.4

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 2006/0291290 A1* | 12/2006 | Kim | .................. | G11C 16/3454 365/185.22 |
| 2008/0084749 A1* | 4/2008 | Lee | ........................ | G11C 16/12 365/185.18 |
| 2010/0284219 A1* | 11/2010 | Kim | .................. | G11C 16/3459 365/185.03 |
| 2011/0267905 A1* | 11/2011 | Kim | ........................ | G11C 16/30 365/189.16 |
| 2018/0341552 A1* | 11/2018 | Liikanen | ............. | G11C 11/5628 |
| 2019/0278510 A1* | 9/2019 | Kaynak | ................. | G06F 11/073 |
| 2019/0333591 A1* | 10/2019 | Chen | ...................... | G11C 16/10 |
| 2020/0202938 A1* | 6/2020 | Reina | .................. | G06F 11/0727 |
| 2021/0350853 A1* | 11/2021 | Huang | ................... | G11C 16/26 |
| 2021/0391014 A1* | 12/2021 | Li | ...................... | G11C 16/3481 |
| 2023/0077184 A1* | 3/2023 | Choi | ................... | G11C 11/5628 |

* cited by examiner

*Primary Examiner* — Yaima Rigol
*Assistant Examiner* — Elias Young Kim
(74) *Attorney, Agent, or Firm* — BAYES PLLC

(57) ABSTRACT

The present disclosure provides a memory programming method, a memory device and a memory system. The memory device comprises a plurality of memory cells. The method comprises: performing a first incremental step pulse programming on the memory cells; performing a first programmed state verification on the memory cells; and performing a second incremental step pulse programming on the memory cells, comprising: determining an incremental voltage in the second incremental step pulse programming being less than a default incremental voltage, in response to a programming temperature of the memory cells being within a preset first temperature range. Implementations of the present disclosure can improve read margin of the memory cells, reduce read errors, and reduce overall loss for the performance of the memory device.

15 Claims, 8 Drawing Sheets programming temperature programming temperature

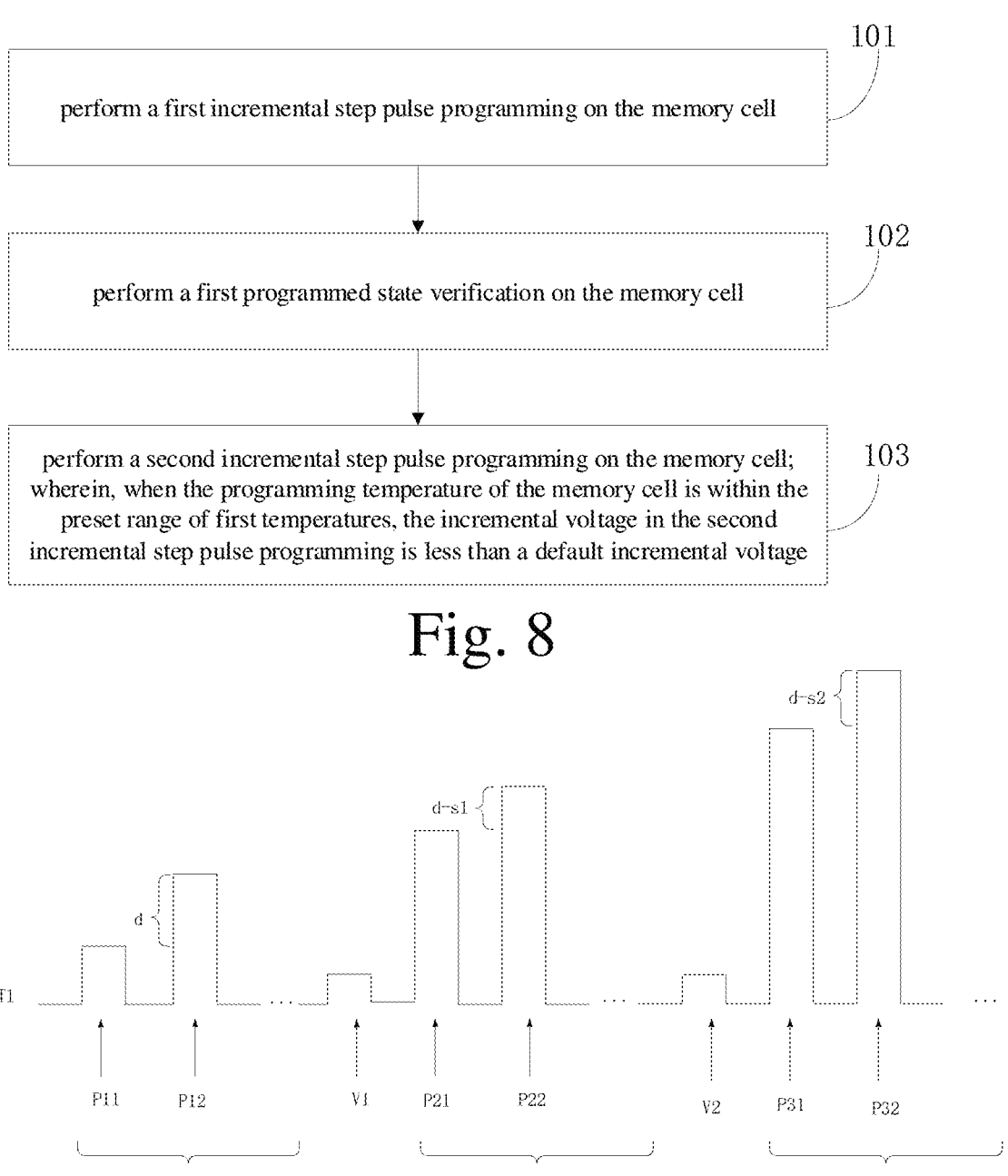

101
perform a first incremental step pulse programming on the memory cell 102
perform a first programmed state verification on the memory cell 103
perform a second incremental step pulse programming on the memory cell; wherein, when the programming temperature of the memory cell is within the preset range of first temperatures, the incremental voltage in the second incremental step pulse programming is less than a default incremental voltage

ISPP1              ISPP2                  ISPP3

Fig. 9

MEMORY PROGRAMMING METHOD, MEMORY DEVICE, AND MEMORY SYSTEM

CROSS-REFERENCE TO RELATED APPLICATIONS

This application claims the benefit of priority to China Patent Application No. CN 202310186642.4, filed on Feb. 27, 2023, the content of which is incorporated herein by reference in its entirety.

FIELD OF TECHNOLOGY

The present disclosure relates to the technical field of semiconductors, and in particular to a memory programming method, a memory and a memory system.

BACKGROUND

A memory device (also referred as "a memory" herein) may perform various operations such as reading, programming (writing) and erasing. How to operate the memory to improve the performance of the memory has become an urgent issue to be solved.

SUMMARY

The present disclosure provides a memory programming method, a memory device and a memory system, which can improve read margin of memory cells, reduce read errors, and have less overall loss for the performance.

The present disclosure provides a memory programming method, the memory comprises a plurality of memory cells, and the method comprises: performing a first incremental step pulse programming on the memory cell; performing a first programmed state verification on the memory cell; performing a second incremental step pulse programming on the memory cell; wherein, when the programming temperature of the memory cell is within the preset first temperature ranges, the incremental voltage in the second incremental step pulse programming is less than a default incremental voltage.

In some implementations, the incremental voltage in the first incremental step pulse programming is the default incremental voltage.

In some implementations, the method further comprises: performing a second programmed state verification on the memory cell; performing a third incremental step pulse programming on the memory cell; wherein, when the programming temperature of the memory cell is within the first temperature ranges, the incremental voltage in the third incremental step pulse programming is greater than the incremental voltage in the second incremental step pulse programming and less than the default incremental voltage.

In some implementations, the threshold voltage of the second programmed state is greater than the threshold voltage of the first programmed state.

In some implementations, the method further comprises: performing a third programmed state verification on the memory cell; performing a fourth incremental step pulse programming on the memory cell; wherein, when the programming temperature of the memory cell is within the first temperature ranges, the incremental voltage in the fourth incremental step pulse programming is greater than the incremental voltage in the third incremental step pulse programming and less than the default incremental voltage, or the incremental voltage in the fourth incremental step pulse programming is equal to the incremental voltage in the third incremental step pulse programming.

In some implementations, the threshold voltage of the third programmed state is greater than the threshold voltage of the second programmed state.

In some implementations, when the programming temperature of the memory cell is within the preset second temperature ranges, the incremental voltage in the second incremental step pulse programming is the default incremental voltage, and the temperature in the second temperature ranges is higher than the temperature in the first temperature ranges.

In some implementations, when the programming temperature of the memory cell is within the first temperature ranges, the initial programming voltage of the first incremental step pulse programming is greater than the default programming voltage.

In some implementations, when the programming temperature of the memory cell is within the preset second temperature ranges, the initial programming voltage of the first incremental step pulse programming is the default programming voltage, and the temperature in the second temperature ranges is higher than the temperature in the first temperature ranges.

Accordingly, the present disclosure further provides a memory, including: a memory cell; a peripheral circuit coupled to the memory cell, the peripheral circuit is configured to: perform a first incremental step pulse programming on the memory cell; perform a first programmed state verification on the memory cell; perform a second incremental step pulse programming on the memory cell; wherein, when the programming temperature of the memory cell is within the preset first temperature ranges, the incremental voltage in the second incremental step pulse programming is less than a default incremental voltage.

In some implementations, the incremental voltage in the first incremental step pulse programming is the default incremental voltage.

In some implementations, the peripheral circuit is further configured to: perform a second programmed state verification on the memory cell; perform a third incremental step pulse programming on the memory cell; wherein, when the programming temperature of the memory cell is within the first temperature ranges, the incremental voltage in the third incremental step pulse programming is greater than the incremental voltage in the second incremental step pulse programming and less than the default incremental voltage.

In some implementations, the threshold voltage of the second programmed state is greater than the threshold voltage of the first programmed state.

In some implementations, the peripheral circuit is further configured to: perform a third programmed state verification on the memory cell; perform a fourth incremental step pulse programming on the memory cell; wherein, when the programming temperature of the memory cell is within the first temperature ranges, the incremental voltage in the fourth incremental step pulse programming is greater than the incremental voltage in the third incremental step pulse programming and less than the default incremental voltage, or the incremental voltage in the fourth incremental step pulse programming is equal to the incremental voltage in the third incremental step pulse programming.

In some implementations, the threshold voltage of the third programmed state is greater than the threshold voltage of the second programmed state.

In some implementations, when the programming temperature of the memory cell is within the preset second temperature ranges, the incremental voltage in the second incremental step pulse programming is the default incremental voltage, and the temperature in the second temperature ranges is higher than the temperature in the first temperature ranges.

In some implementations, when the programming temperature of the memory cell is within the first temperature ranges, the initial programming voltage of the first incremental step pulse programming is greater than the default programming voltage.

In some implementations, when the programming temperature of the memory cell is within the preset second temperature ranges, the initial programming voltage of the first incremental step pulse programming is the default programming voltage, and the temperature in the second temperature ranges is higher than the temperature in the first temperature ranges.

Accordingly, the present disclosure further provides a memory system, comprising: a memory described above and a memory controller coupled to the memory.

Implementations of the present disclosure provide a memory programming method, a memory and a memory system, which can perform a first incremental step pulse programming on the memory cell; perform a first programmed state verification on the memory cell; perform a second incremental step pulse programming on the memory cell, and when the programming temperature of the memory cell is within the preset first temperature ranges, the incremental voltage in the second incremental step pulse programming is less than a default incremental voltage, so as to adjust programming speed of the memory cell in the first temperature ranges, improve read margin of the memory cell in the first temperature ranges, reduce read errors, and have less overall loss for the performance, thereby improving reliability of product.

BRIEF DESCRIPTION OF THE DRAWINGS

In order to more clearly illustrate the technical solutions in the implementations or the prior art, the accompanying drawings that need to be used in the description of the implementations or the prior art will be briefly introduced below, and apparently, the accompanying drawings in the following description are only some implementations of the present disclosure, and those skilled in the art may also achieve other drawings according to these accompanying drawings without any creative efforts.

FIG. 8 is a schematic flowchart of a memory programming method provided by an implementation of the present disclosure;

FIG. 9 is a schematic diagram of programming pulses in a memory provided by an implementation of the present disclosure;

DETAILED DESCRIPTION

Figure 1:
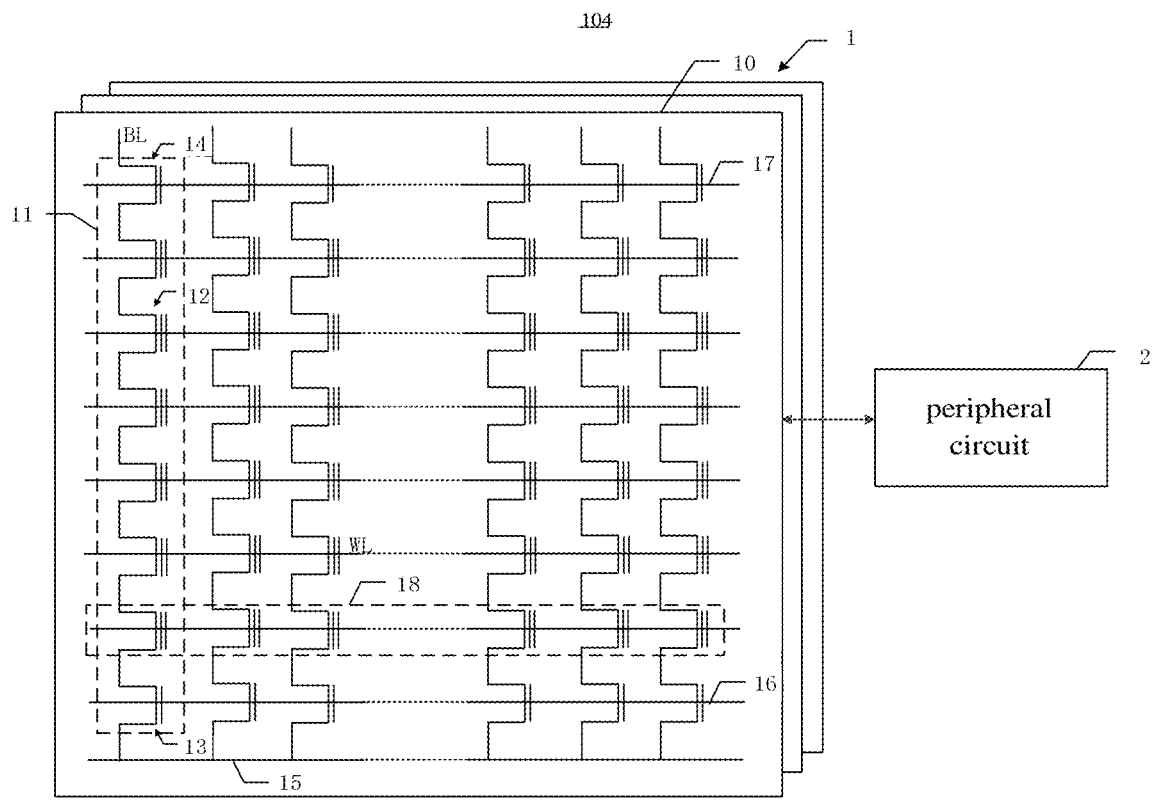
FIG. 1 is a schematic structural diagram of a memory provided by an implementation of the present disclosure.

Specific structural and functional details disclosed herein are representative only and for purposes of describing exemplary implementations of the present disclosure. This present disclosure may, however, be embodied in many alternative forms and should not be construed as limited to only the implementations set forth herein.

In description of the present disclosure, it is to be understood that the orientation or positional relationship indicated by terms "center", "lateral", "upper", "lower", "left", "right", "vertical", "horizontal", "top", "bottom", "inner", "outer", etc., is based on the orientation or positional relationship shown in the drawings, and is only for the convenience of describing the present disclosure and simplifying the description, rather than indicating or suggesting that the apparatus or element referred to must have a specific orientation or must be constructed and operate in a specific orientation, therefore, should not be construed as limiting the present disclosure. Additionally, the terms "first" and "second" are used for descriptive purposes only, and should not be understood as indicating or suggesting relative importance or implicitly specifying the quantity of indicated technical features. Thus, a feature defined as "first" and "second" may explicitly or implicitly include one or more of these features. In the description of the present disclosure, "plurality" means two or more, unless specified otherwise. Additionally, the term "comprise" and any variations thereof, are intended to cover a non-exclusive inclusion.

In the description of the present disclosure, it should be noted that unless otherwise specified and limited, the terms "connected" and "connection" should be understood in a broad sense, e.g., it may be a fixed connection, a detachable connection, or an integral connection; it may be a mechanical connection or an electrical connection; it may be directly connected, or indirectly connected through an intermediary, and may be internally connected between two elements. Those of ordinary skill in the art may understand the specific meanings of the above terms in the present disclosure in particular situations.

The terms used herein is for the purpose of describing particular implementations only and is not intended to be limiting of exemplary implementations. As used herein, the singular forms "a" and "an" are intended to include the plural unless the context clearly dictates otherwise. It should also be understood that the terms "comprising" and/or "containing" as used herein specify the presence of stated features, integers, steps, operations, units and/or components, but do not exclude the presence or addition of one or more other features, integers, steps, operations, units, components and/or combinations thereof.

Implementations of the present disclosure provide a memory programming method, a memory and a memory system.

Referring to FIG. 1, it is a schematic structural diagram of a memory provided by an implementation of the present disclosure. The memory includes a memory array 1 and a peripheral circuit 2 coupled to the memory array 1. The memory array 1 may be a non-volatile memory array, which maintains its state when power is off.

The memory array 1 includes a plurality of memory blocks 10, and a memory block is a basic data unit for an erasing operation. The memory block 10 includes a plurality of memory strings 11, and each memory string 11 includes a plurality of memory cells 12 coupled in series and arranged in a stack. Each memory cell 12 may be a "floating gate" type of a memory cell including a floating gate transistor, or a "charge trap" type of a memory cell including a charge trap transistor.

Each memory string 11 may be coupled to a source selecting transistor 13 (source selecting transistor 13 coupled to SSG line 16) at its source terminal and to a drain selecting transistor 14 (drain selecting transistor 14 coupled to DSG line 17) at its drain terminal. Source selecting transistor 13 and drain selecting transistor 14 may be configured to activate selecting string 11 during read operation and program (write) operation. In some implementations, the source selecting transistors 13 of the memory strings 11 in a same memory block are coupled through a same source line 15 (e.g., a common source line), i.e., all the memory strings 11 in the same memory block have an array common source. The drain selecting transistor 14 of each memory string 11 is coupled to a corresponding bit line BL, from which data may be read or written via an output bus (not shown in the figure). Memory cells 12 of adjacent memory strings 11 are coupled through a word line WL that selects which row of memory cells 12 is affected by the read operation. In some implementations, each word line WL is coupled to a memory page 18 of memory cell 12, memory page is the basic data unit for program operation and read operation.

The peripheral circuitry 2 may be coupled to the memory array 1 through bit line BL, word line WL, source line 15, SSG line 16 and DSG line 17. Peripheral circuitry 2 may include any suitable analog, digital, and mixed-signal circuitry for facilitating operation of the memory array 1 through applying a voltage signal and/or a current signal to and sensing voltage signal and/or current signal from each target memory cell 12 via bit line BL, word line WL, source line 15, SSG line 16, and DSG line 17. The peripheral circuit 2 may include various types of peripheral circuits formed with metal-oxide-semiconductor (MOS) technology.

Figure 2:
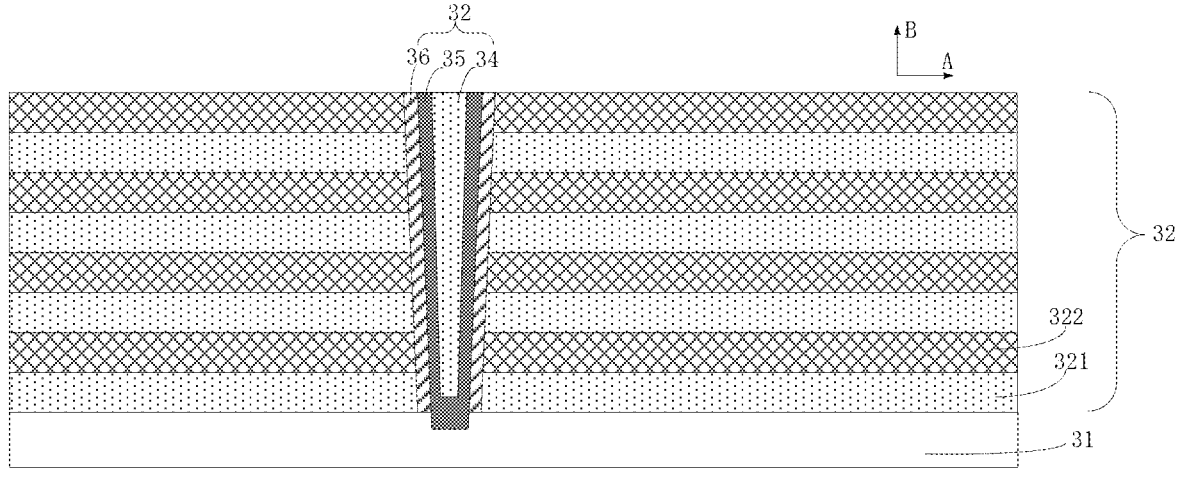
FIG. 2 is a schematic structural diagram of a memory array in a memory provided by an implementation of the present disclosure.

FIG. 2 is a schematic cross-sectional view of the memory array 1. As shown in FIG. 2, the memory array 1 includes a substrate 31 and a stacked structure 32 on the substrate 31. Wherein the substrate 31 may include single crystal silicon, polycrystalline silicon, single crystal germanium, III-V group compound semiconductor material, II-VI group compound semiconductor material or other semiconductor materials. The stacked structure 32 may include insulating layers 321 and gate layers 322 alternately stacked along the direction A. The number of stacked layers in the stacked structure 32 may be 32 layers, 64 layers, 128 layers, etc., which is not specifically limited here. The material of the insulating layer 321 may include at least one of materials such as silicon oxide, silicon nitride, silicon oxynitride, doped silicon oxide, organic silicate glass, etc. The material of the gate layer 322 may include at least one of tungsten, cobalt, copper, aluminum, doped polysilicon, metal silicide, etc.

The gate layer 322 may include a control gate of the memory cell 12, a gate of the source selecting transistor 13, or a gate of the drain selecting transistor 14. The gate layer 322 may extend in direction A as a word line connected to the control gate of the memory cell 12, a SSG line 16 connected to the gate of the source selecting transistor 13, or a DSG line 17 connected to the drain selecting transistor 14. Wherein the direction A is perpendicular to the stacking direction of the stacked structure 32.

The memory array 1 further includes a memory channel structure 33 penetrating through the stacked structure 32 along the direction B. Wherein the direction B is consistent with the stacking direction of the stacked structure 32. The memory channel structure 33 may include a channel filling layer 34, a channel layer 35 disposed around the channel filling layer 34, and a memory film 36 disposed around the channel layer 35. The storage film 36 may include a tunneling layer (not shown in the figure) disposed around the channel layer 35, a storage layer (not shown in the figure) disposed around the tunneling layer, and a barrier layer (not shown in the figure) disposed around the storage layer. Wherein the barrier layer and the tunneling layer may comprise silicon oxide, silicon oxynitride or any combination thereof; the storage layer may comprise silicon nitride, silicon oxynitride, silicon or any combination thereof; and the channel layer 35 comprises silicon, such as amorphous silicon, polycrystalline silicon, or single crystal silicon. Memory film 36 and channel layer 35 may be formed by using one or more thin film deposition processes such as ALD, CVD, PVD, any other suitable process, or any combination thereof. In an example, the memory film 36 may include a composite layer of silicon oxide/silicon nitride/silicon oxide (ONO).

Figures 3, 4:
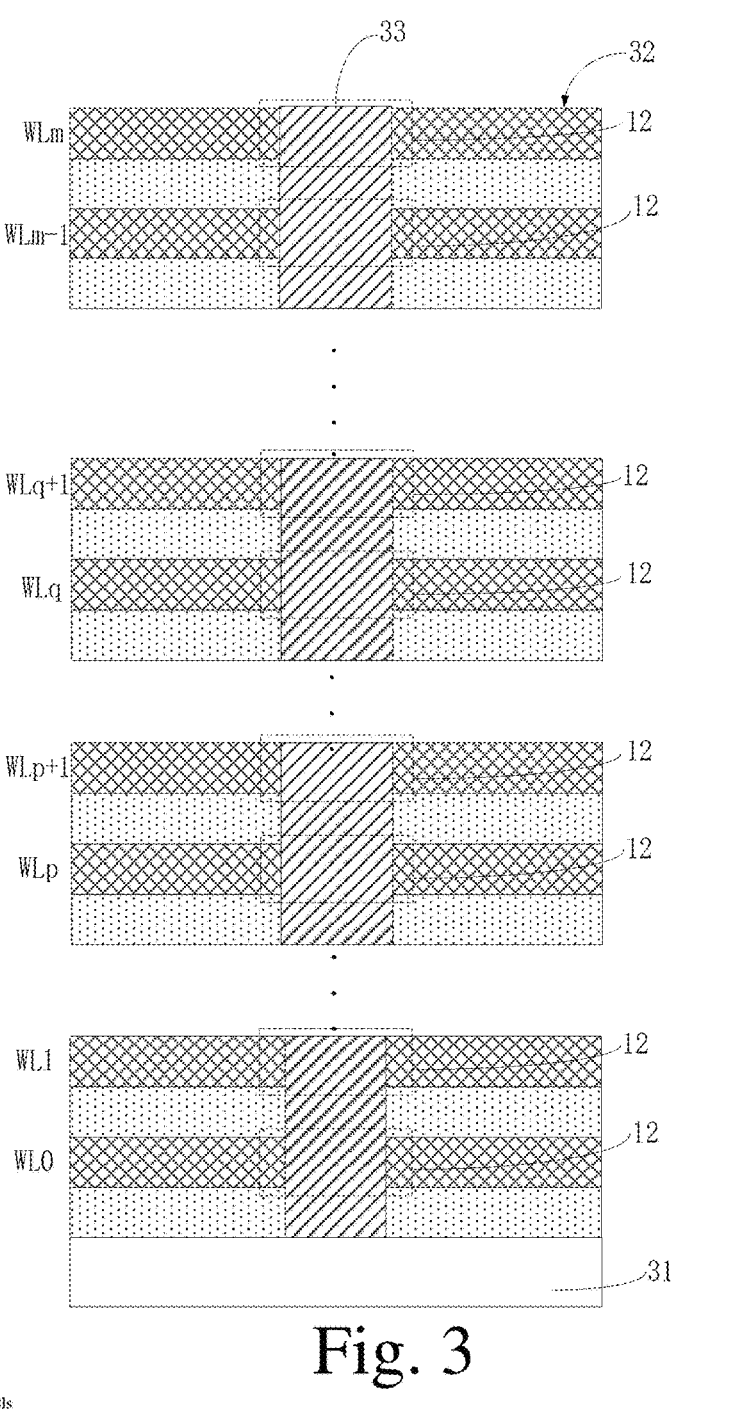
FIG. 3 is another schematic structural diagram of a memory array in a memory provided by an implementation of the present disclosure.
FIG. 4 is a graph of threshold voltage versus the number of memory cells in a memory provided by an implementation of the present disclosure.

The memory channel structure 33 penetrates the stacked structure 32 to form a plurality of memory cells 12 stacked along the direction B on the substrate 31, and the gate layer connected to the memory cells 12 forms a word line WL. As shown in FIG. 3, the memory array may include a plurality of memory cells 12 stacked in sequence along direction B, each memory cell 12 is correspondingly connected to a word line WL, and the number of word lines from the bottom to the top of the memory array is WL0, . . . , WLp, WLp+1, . . . , WLq, WLq+1, . . . , Wlm in sequence. Wherein, p, q and m are all positive integers, and m>q>p.

The principle by which memory stores information is to change the threshold voltage of the memory cell through changing the amount of charge stored in the storage medium, so as to achieve the purpose of storing information. For example, for a memory cell in the state of erasing data, it may be considered that there are no electrons in its storage medium, thus its threshold voltage is lower than the read voltage, and its stored information is considered to be 1. For a memory cell in the state of storing data, there are electrons in the storage medium, and its threshold voltage is usually greater than the read voltage, and its stored information is considered to be 0.

Multiple bits of information may be stored in a memory cell, which is achieved through designing multiple sets of threshold voltages, and further programming the memory cell into multiple data states, each of which has a different threshold voltage. FIG. 4 is a graph of threshold voltage versus number of memory cells and shows an exemplary threshold voltage distribution of a memory array when each memory cell stores four bits of data. 16 threshold voltage distributions are shown in FIG. 4, corresponding to 16 threshold voltage distributions: E (also referred to as L0), L1, L2, L3, L4, L5, L6, L7, L8, L9, L10, L11, L12, L13, L14, L15, the threshold voltage increases sequentially. Similarly, the threshold voltage distribution E corresponds to the erasing data state; the threshold voltage distribution L1, L2, L3, L4, L5, L6, L7, L8, L9, L10, L11, L12, L13, L14, L15 corresponds to the programmed data state (i.e., programmed state), for data state N, the data state N has a threshold voltage higher than that of data state N−1 and lower than that of data state N+1. In some implementations, the memory cells store four bits of data, specifically, the erased memory cells may store data 1111, memory cells programmed to L1, L2, L3, L4, L5, L6, L7, L8, L9, L10, L11, L12, L13, L14, L15 data states may store data 1110, 1101, 1100, 1011, 1010, 1201, 1000, 0111, 0110, 0101, 0100, 0011, 0010, 0001, 0000, sequentially. FIG. 4 also shows 15 read reference voltages Vr1, Vr2, Vr3, Vr4, Vr5, Vr6, Vr7, Vr8, Vr9, Vr10, Vr11, Vr12, Vr13, Vr14, Vr15, which are used to read data from the memory cell, specifically, the reading process may be: testing, such as performing a sensing operation, whether the threshold voltage of a given memory cell is higher or lower than the 15 read reference voltages, thereby the memory system may determine the data state that the memory cell is in.

FIG. 4 also shows 15 verification reference voltages Vv1, Vv2, Vv3, Vv4, Vv5, Vv6, Vv7, Vv8, Vv9, Vv10, Vv11, Vv12, Vv13, Vv14 and Vv15, which may also be referred to as verification target voltage. When programming a memory cell to data state L1, it is determined whether the memory cell has a threshold voltage greater than or equal to Vv1. When programming a memory cell to data state L2, it is determined whether the memory cell has a threshold voltage greater than or equal to Vv2. A memory cell is verified in term of whether it has a threshold voltage greater than or equal to Vv3, Vv4, Vv5, Vv6, Vv7, Vv8, Vv9, Vv10, Vv11, Vv12, Vv13, Vv14, and Vv15, to determine whether it is programmed to L3, L4, L5, L6, L7, L8, L9, L10, L11, L12, L13, L14, L15, correspondingly, and so on. In an implementation known as full sequence programming, a memory cell may be programmed directly from the erased data state L0 to any of the programmed data states L1-S15. For example, a cluster of memory cells to be programmed may be erased first such that all memory cells in the cluster are in erased data state L0. Then, a programming process is used to program the memory cells directly into one of the data states L1, L2, L3, L4, L5, L6, L7, L8, L9, L10, L11, L12, L13, L14, L15. For example, while some memory cells are being programmed from data state L0 to data state L1, other memory cells are being programmed from data state L0 to data state L2 and/or from data state L0 to data state L3, and so on.

In general, during a verifying operation and a read operation, a selected word line is connected to a voltage, which is a reference signal, the level of this voltage is specified for each read operation (e.g., see the read reference voltage in FIG. 4) or verifying operation (e.g., see the verify reference voltage in FIG. 4), in order to determine whether the threshold voltage of the associated memory cell has reached this level. After applying the voltage on the word line, the conduction current of the memory cell is measured to determine whether the memory cell is turned on in response to the voltage applied to the word line (whether there is conduction current and the magnitude of the conduction current is measured). If the conduction current is measured to be greater than a certain value, it is assumed that the memory cell is turned on and the voltage applied to the word line is greater than the threshold voltage of the memory cell. If the conduction current is not measured to be greater than a certain value, it is assumed that the memory cell is not turned on and the voltage applied to the word line is not greater than the threshold voltage of the memory cell. During a reading process or verifying process, an unselected memory cell is provided, at its control gate, with one or more pass voltages, which may also be referred to as a bypass voltage, so that these memory cells will operate as pass gates, conducting current regardless of whether these memory cells are programmed or erased.

In this implementation, Margin is employed to represent a voltage interval between threshold voltage distributions corresponding to two adjacent data states that can be used to read data on a memory cell in one of the data states. For example, the first Margin may refer to the voltage interval between the threshold voltage distribution corresponding to the memory cell in the erased state and the threshold voltage distribution corresponding to the memory cell in the first programming state, that can be used to read data on memory cells in the erased state, the voltage range may also be referred to as E0. As shown in FIG. 4, in a QLC type memory cell (a four-level cell capable of storing 4 bits), the voltage interval between the lower tail of the threshold voltage distribution corresponding to the data state L0 and the voltage Vr1 is the first Margin E0. Those skilled in the art would know that for QLC type memory cells, there are two Margins between every two adjacent data states, the former Margin is used to read data on the memory cell in the previous data state, and the latter A Margin is used to read data on the memory cell in the latter data state, e.g., the Margin between the data state L0 and the data state L includes E0 and E1, and E1 is the voltage interval between the voltage Vr1 and the upper tail of the threshold voltage distribution corresponding to the data state L1. In some implementations, for memory cells of QLC type, all of Margins may include a total of 30 Margins: E0, E1, . . . , E29, which may be recorded as:

$$ESUM = E0 + E1 + \ldots + E29.$$

A memory cell may be programmed at different temperatures. Wherein the programming is ISPP (Increment Step Pulse Program), i.e., the voltage of the programming pulse is gradually increased from the initial voltage to the target voltage based on the step voltage (i.e., the incremental voltage). The Margins of the memory cell after being programmed at different temperatures are significantly different, which makes the ESUM significantly different. Since the channel layer in the memory array is mainly a polysilicon channel, such that the phonon scattering is suppressed, and the carrier mobility is improved, therefore higher conductivity is obtained. However, the polysilicon channel has high temperature sensitivity and high density of grain boundary traps, which will seriously affect the electrical characteristics such as current subthreshold slope (SS), transconductance (gm), and channel resistance (Rch). When the memory cell is programmed at low temperature, the programming speed is slow, the current subthreshold slope is large, the Margin is small, and the ESUM is small, which easily lead to reading errors and affect reliability of product.

In some implementations, in order to solve the influence caused by the temperature difference, the incremental voltage in the ISPP operation described above is compensated to reduce the incremental voltage, while the initial programming voltage remains unchanged. For example, the incremental voltage in the ISPP operation described above is the default incremental voltage d, the compensating voltage is a ($0<a<d$), the compensated incremental voltage is d−a, and the first programming voltage is the default programming voltage P0. Based on the first programming voltage P0 and the compensated incremental voltage d−a, after performing ISPP operation on the memory cell, it is found that the Margin of the memory cell after low-temperature programming is improved, and the larger a (i.e., the larger the compensated voltage), the more obvious the improvement effect. For example, the Margin at a=100 mv is larger than the Margin at a=50 mv. However, compared with the Margin of high-temperature programming, there is still a large gap in the Margin of low-temperature programming, and the loss of the overall tPROG (total time required for programming) of the memory array is large.

In some other implementations, in order to solve the influence caused by the temperature difference, the initial programming voltage in the ISPP operation described above is compensated to increase the first programming voltage, while the incremental voltage remains unchanged. For example, the initial programming voltage in the ISPP operation described above is the default programming voltage P0, the compensating voltage is b (b>0), the compensated initial programming voltage is P1=P0+b, and the incremental voltage is the default incremental voltage d. Based on the compensated initial programming voltage P1 and incremental voltage d, after performing ISPP operation on the memory cell, it is found that the overall tPROG of the memory array is significantly reduced, but there is a risk of overprogramming (overpgm), i.e., there is a risk of a higher threshold voltage written in a programmed state (especially a low programmed state).

Figure 5:
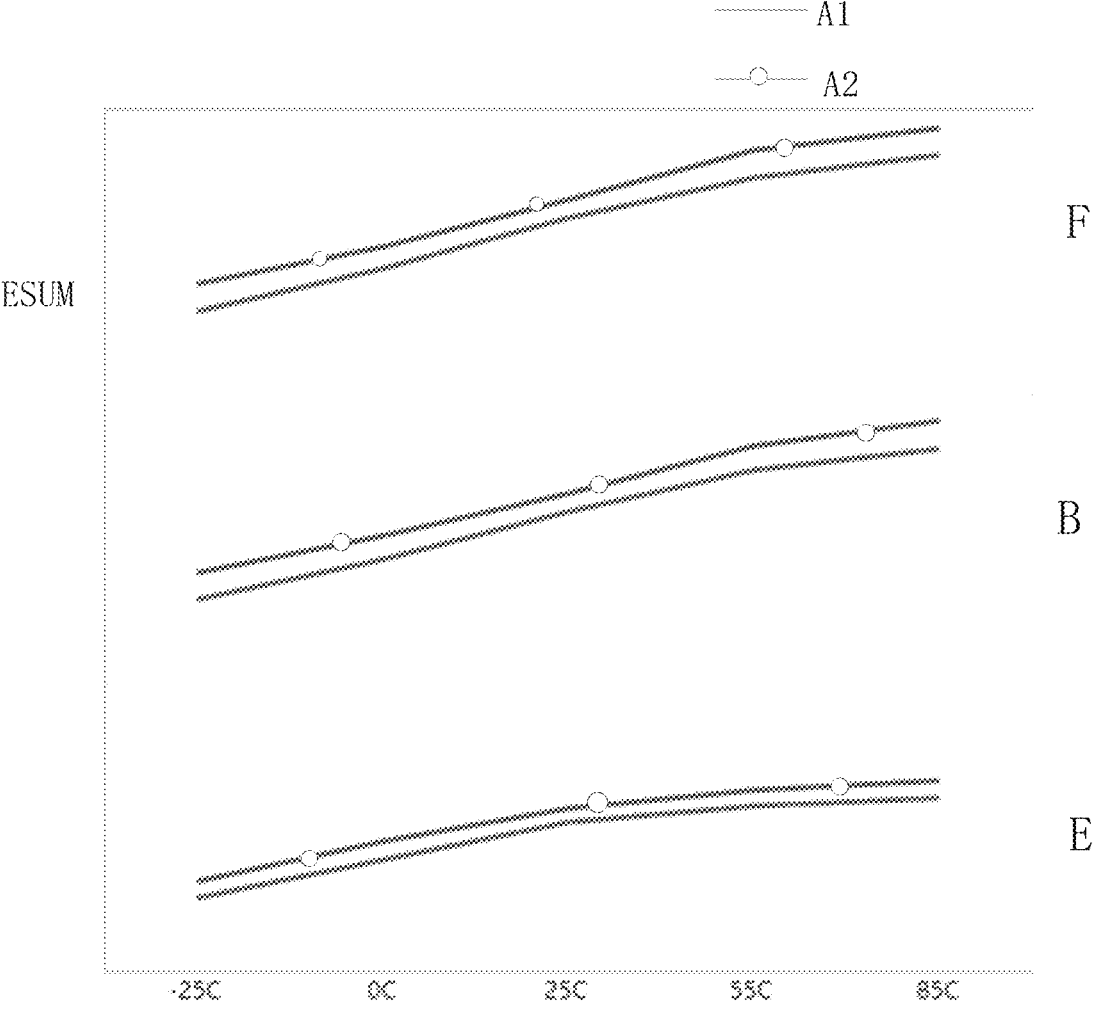
FIG. 5 is a schematic ESUM diagram of a memory cell in a memory provided by an implementation of the present disclosure under different programming temperatures and different operations.
Figure 6:
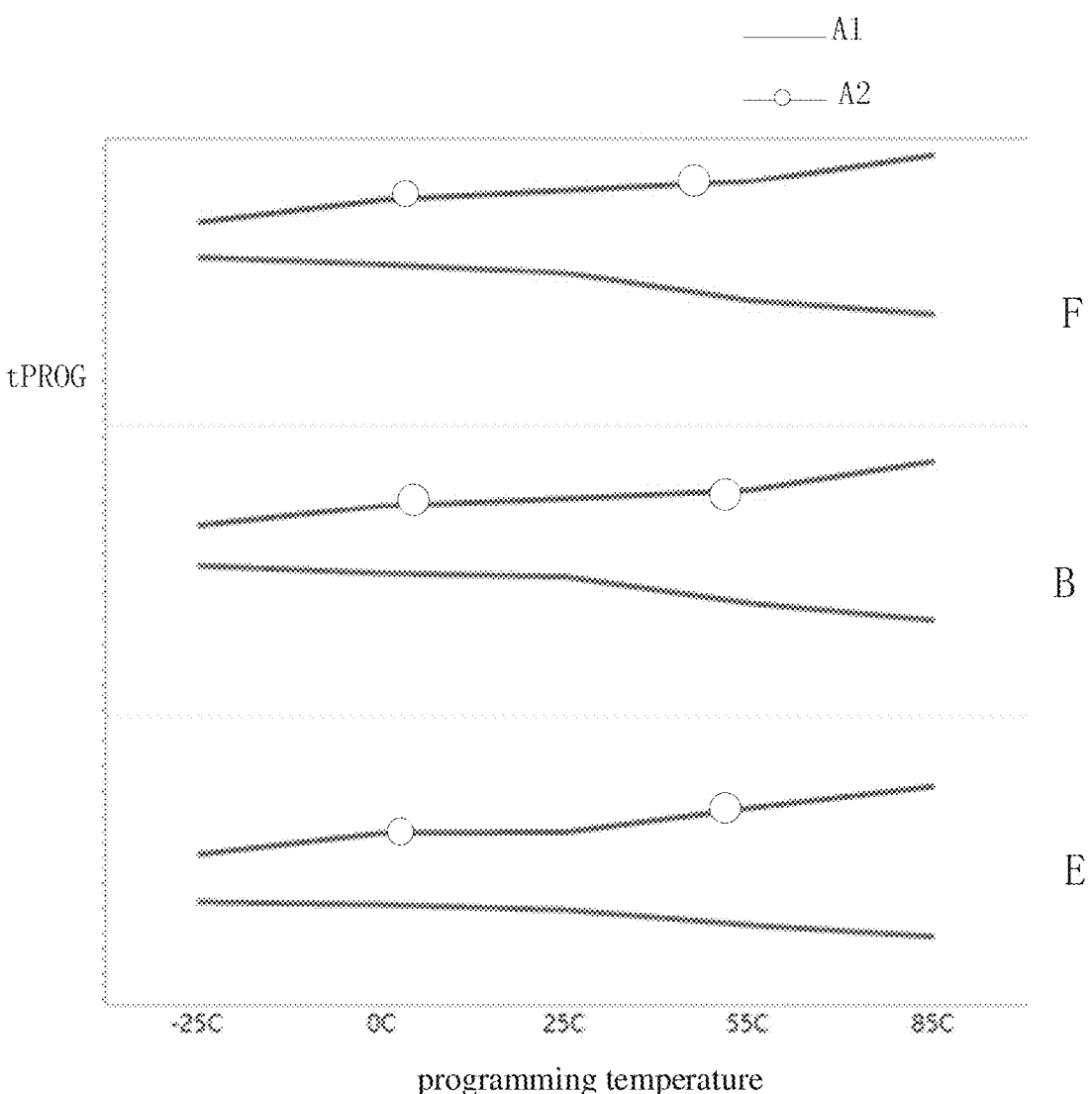
FIG. 6 is a schematic tPROG diagram of a memory cell in a memory provided by an implementation of the present disclosure under different programming temperatures and different operations.
Figure 7:
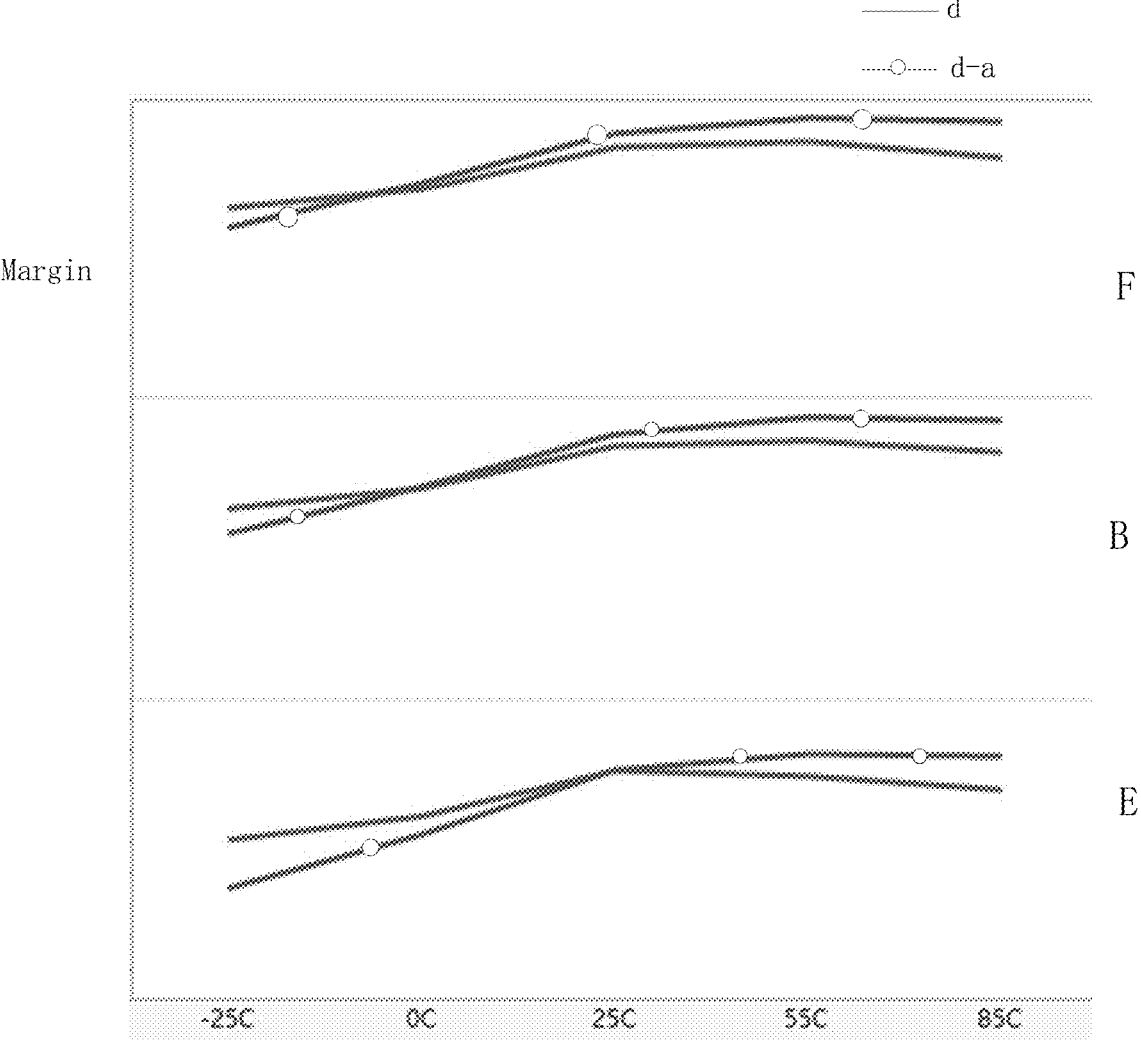
FIG. 7 is a schematic Margin diagram of a memory cell in a memory provided by an implementation of the present disclosure under different programming temperatures and different operations.

As shown in FIGS. 5 to 7, when the programming temperature is −25° C., 0° C., 25° C., 55° C. and 85° C., the first ISPP operation A1 and the second ISPP operation A2 are performed on the memory blocks in the F stage, B stage, and E stage respectively, and ESUM, tPROG, and Margin of the memory cells after programming are detected. Wherein, the initial programming voltage in the first ISPP operation A1 is the default programming voltage P0, and the incremental voltages are all d, and the initial programming voltage in the second ISPP operation A2 is P1=P0+b, and the incremental voltages are all d−a. The memory cell may be divided into multiple stages according to the times of usage, such as F stage, B stage and E stage. Stage F means that the times of usage of the memory cell are less than the preset times (i.e., the memory cell is at the beginning of its life, and the preset times may be 1). Stage B means that the times of usage of the memory cell are greater than the preset times and less than threshold of times (i.e., the memory cell is in the middle of its life). Stage E means that the times of usage of the memory cell are greater than threshold of times (i.e., the memory cell is at the end of its life).

In FIG. 5, the horizontal axis represents the programming temperature, and the vertical axis represents ESUM. It may be seen from FIG. 5 that at different temperatures, each ESUM of the memory block after the second ISPP operation A2 is greater than the ESUM after the first ISPP operation A1. In FIG. 6, the horizontal axis represents the programming temperature, and the vertical axis represents tPROG. It may be seen from FIG. 6 that at a low temperature, the tPROG sacrifice of the memory block after the second ISPP operation A2 is not obvious compared with the tPROG sacrifice after the first ISPP operation A1, but at a high temperature, the tPROG sacrifice of the memory block after the second ISPP operation A2 is larger than the tPROG sacrifice after the first ISPP operation A1. In FIG. 7, the horizontal axis represents the programming temperature, and the vertical axis represents the Margin of the low programmed state. It may be seen from FIG. 7 that at a low temperature, compared with the first ISPP operation A1, the Margin of the low programmed state of the memory block after the second ISPP operation A2 is smaller. That is, the phenomenon of overpgm in the low programmed state is serious during low-temperature programming, which leads to Margin loss.

Based on this, an implementation of the present disclosure provides a method for operating a memory.

Referring to FIG. 8, it is a schematic flowchart of a method for operating a memory provided by an implementation of the present disclosure.

As shown in FIG. 8, the method for operating a memory provided by the implementation of the present disclosure comprises steps 101 to 103, specifically as follows:

Step 101. perform a first incremental step pulse programming on the memory cell.

When the programming temperatures of the memory cells are in different temperature ranges, the first incremental step pulse programming (i.e., the first ISPP) is first performed on the memory cells. Wherein the programming temperature is mainly the ambient temperature, i.e., the ambient temperature at which the memory cells is being programmed is the programming temperature. In some implementations, a temperature sensor may be set in the memory (e.g., in the peripheral circuit), so as to measure the ambient temperature through the temperature sensor, thereby obtaining the programming temperature.

In the first incremental step pulse programming, multiple programming pulses are applied to the memory cell in sequence, and the voltage of the latter programming pulse is greater than the voltage of the previous programming pulse. The incremental voltage in the first incremental step pulse programming may be the default incremental voltage d, i.e., the voltage difference between the latter programming pulse and the previous programming pulse in the first incremental step pulse programming is the default incremental voltage d.

In an implementation, when the programming temperature of the memory cell is within the first temperature ranges, the initial programming voltage (i.e., the voltage of the first programming pulse) in the first incremental step pulse programming may be compensated to increase the initial programming voltage, i.e., the initial programming voltage in the first incremental step pulse programming is greater than the default programming voltage. For example, the default programming voltage is P0, the compensating voltage is c (c>0), and the initial programming voltage of the first incremental step pulse programming is P11=P0+c. Therefore, as shown in FIG. 9, in the first incremental step pulse programming ISPP1 of the memory cell in the first range T1 of temperatures, the voltage of the first programming pulse is P11=P0+c, the voltage of the second programming pulse is P12=P11+d, and the voltage of the third programming pulse is P13=P12+d, and so on until the number of programming pulses reaches the preset number (the preset number is the number of programming pulses preset in the first incremental step pulse programming).

Figure 10:
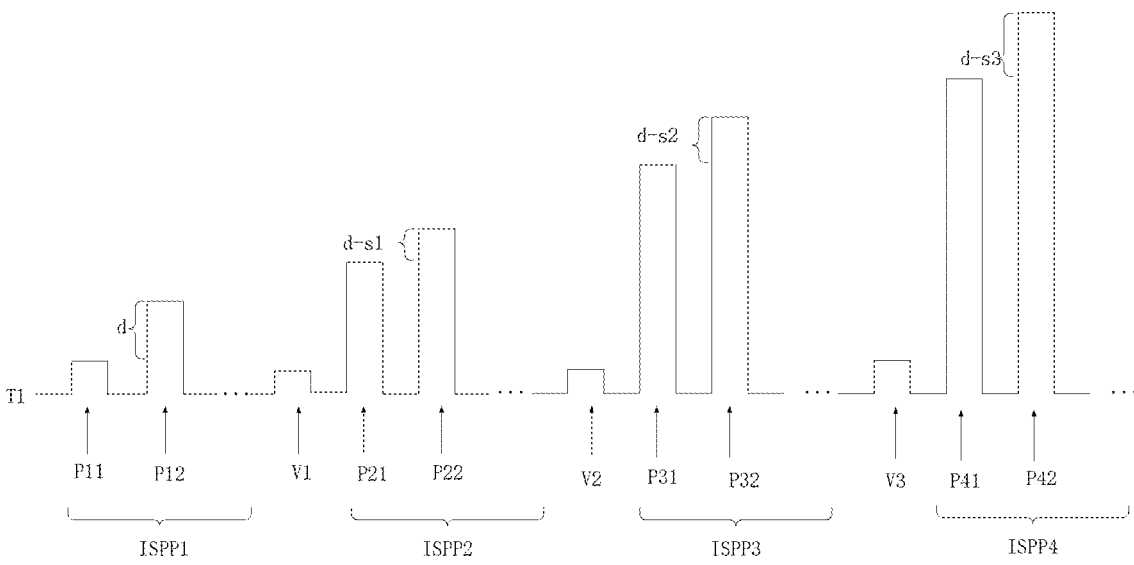
FIG. 10 is another schematic diagram of programming pulses in a memory provided by an implementation of the present disclosure.

In another implementation, when the programming temperature of the memory cell is within the first temperature ranges, the initial programming voltage in the first incremental step pulse programming may not be compensated, i.e., the initial programming voltage in the first incremental step pulse programming is the default programming voltage P0. Therefore, as shown in FIG. 10, in the first incremental step pulse programming ISPP1 of the memory cell in the first range T1 of temperatures, the voltage of the first programming pulse is P11=P0, the voltage of the second programming pulse is P12=P11+d, and the voltage of the third programming pulse is P13=P12+d, and so on until the number of programming pulses reaches the preset number (the preset number is the number of programming pulses preset in the first incremental step pulse programming).

It should be noted that the first temperature ranges is a temperature ranges which has a greater influence on the programming of memory cells, i.e., the ESUM of memory cells programmed in the first temperature ranges is smaller than ESUM of memory cells programmed in other temperature ranges. The first temperature ranges may be a relatively low temperature range, e.g., −25° C. to 0° C.

Step 102. perform a first programmed state verification on the memory cell.

The first programmed state verification refers to verifying whether the threshold voltage of the memory cell reaches the threshold voltage of the first programmed state. Wherein, the first programmed state is a programmed state more prone to overpgm problem. For example, the first programmed state may be a programmed state with a relatively low threshold voltage, e.g., the first programmed state L1 in FIG. 4.

In an implementation, in the first incremental step pulse programming, whenever a programming pulse is applied to a memory cell, a verification voltage may be applied to the memory cell, to verify whether the threshold voltage of the memory cell reaches the threshold voltage of the first programmed state.

In another implementation, in order to further reduce tPROG, in the first incremental step pulse programming, whenever a plurality of programming pulses may be applied to the memory cell, a verification voltage may be applied to the memory cell. Alternatively, as shown in FIG. 9, the verification voltage is not applied to the memory cell during the first incremental step pulse programming ISPP1, but after the last programming pulse in the first incremental step pulse programming ISPP1 is applied to the memory cell, a verification voltage V1 is applied to the memory cell to perform the first programmed state verification on the memory cell to verify whether the threshold voltage of the memory cell reaches the threshold voltage of the first programmed state. Since not all of the memory cells are verified after being applied the programming pulse, the number of programming pulses in the first incremental step pulse programming may be preset, so that the threshold voltage of the memory cell reaches the threshold voltage of the first programmed state after the first incremental step pulse programming is performed on the memory cell.

Step 103. perform a second incremental step pulse programming on the memory cell; wherein, when the programming temperature of the memory cell is within the preset first temperature ranges, the incremental voltage in the second incremental step pulse programming is less than a default incremental voltage.

After the first programmed state verification passes, a second incremental step pulse programming is performed on the memory cell. In the second incremental step pulse programming, multiple programming pulses are applied to the memory cell in sequence, and the voltage of the latter programming pulse is greater than the voltage of the previous programming pulse. When the programming temperature of the memory cell is within the first temperature ranges, the incremental voltage in the second incremental step pulse programming is compensated to reduce the incremental voltage, i.e., the incremental voltage in the second incremental step pulse programming is less than the default incremental voltage. For example, the default incremental voltage is d, the compensating voltage is s1 (s1>0), and the incremental voltage in the second incremental step pulse programming is d−s1.

For example, as shown in FIGS. 9 and 10, in the second incremental step pulse programming ISPP2 of the memory cell in the first range T1 of temperatures, the voltage of the first programming pulse is P21, the voltage of the second programming pulse is P22=P21+(d−s1), and the voltage of the third programming pulse is P23=P22+(d−s1), and so on until the number of programming pulses reaches the preset number (the preset number is the number of programming pulses preset in the second incremental step pulse programming).

Additionally, the voltage difference between the first programming pulse in the second incremental step pulse programming and the last programming pulse in the first incremental step pulse programming may be the same as the incremental voltage in the second incremental step pulse programming. For example, the voltage of the last programming pulse in the first incremental step pulse programming is P13, and the voltage of the first programming pulse in the second incremental step pulse programming may be P21=P13+(d−s1).

In this implementation, when the programming temperature is within the first temperature ranges, the first incremental step pulse programming is first performed on the memory cell with the default incremental voltage d to program the memory cell to the first programmed state, and then the second incremental step pulse programming is performed on the memory cell with the incremental voltage d−s1 to program the memory cell to the next programmed state (e.g., the second programmed state) of the first programmed state, thereby improving read margin of the memory cell in the first temperature ranges, reducing read errors, and having less overall loss for the performance.

When the programming temperature is within the first temperature ranges, in order to reduce the risk of overpgm occurring in the first programmed state, other programmed states (programmed states other than the first programmed state) may be programmed according to other incremental voltages.

In some implementations, the method further comprises: performing a second programmed state verification on the memory cell; performing a third incremental step pulse programming on the memory cell; wherein, when the programming temperature of the memory cell is within the first temperature ranges, the incremental voltage in the third incremental step pulse programming is greater than the incremental voltage in the second incremental step pulse programming and less than the default incremental voltage.

The second programmed state verification refers to verifying whether the threshold voltage of the memory cell reaches the threshold voltage of the second programmed state. Wherein the threshold voltage of the second programmed state is greater than the threshold voltage of the first programmed state. For example, the first programmed state is the first programmed state L1 in FIG. 4, and the second programmed state is the second programmed state L2 in FIG. 4.

In an implementation, in the second incremental step pulse programming, whenever a programming pulse is applied to a memory cell, a verification voltage may be applied to the memory cell, to verify whether the threshold voltage of the memory cell reaches the threshold voltage of the second programmed state.

In another implementation, in order to further reduce tPROG, in the second incremental step pulse programming, whenever a plurality of programming pulses may be applied to the memory cell, a verification voltage may be applied to the memory cell. Alternatively, as shown in FIG. 9, the verification voltage is not applied to the memory cell during the second incremental step pulse programming ISPP2, but after the last programming pulse in the second incremental step pulse programming ISPP2 is applied to the memory cell, a verification voltage V2 is applied to the memory cell to perform the second programmed state verification on the memory cell to verify whether the threshold voltage of the memory cell reaches the threshold voltage of the second programmed state. Since not all of the memory cells are verified after being applied the programming pulse, the number of programming pulses in the second incremental step pulse programming may be preset, so that the threshold voltage of the memory cell reaches the threshold voltage of the second programmed state after the second incremental step pulse programming is performed on the memory cell.

After the second programmed state verification passes, a third incremental step pulse programming is performed on the memory cell. In the third incremental step pulse programming, multiple programming pulses are applied to the memory cell in sequence, and the voltage of the latter programming pulse is greater than the voltage of the previous programming pulse. When the programming temperature of the memory cell is within the first temperature ranges, the incremental voltage in the third incremental step pulse programming is compensated to reduce the incremental voltage, i.e., the incremental voltage in the third incremental step pulse programming is less than the default incremental voltage. For example, the default incremental voltage is d, the compensating voltage is s2 (s2>0), and the incremental voltage in the third incremental step pulse programming is d−s2, s2<s1, i.e., d−s2>d−s1.

For example, as shown in FIGS. 9 and 10, in the third incremental step pulse programming ISPP3 of the memory cell in the first range T1 of temperatures, the voltage of the first programming pulse is P31, the voltage of the second programming pulse is P32=P31+(d−s2), and the voltage of the third programming pulse is P33=P32+(d−s2), and so on until the number of programming pulses reaches the preset number (the preset number is the number of programming pulses preset in the third incremental step pulse programming).

Additionally, the voltage difference between the first programming pulse in the third incremental step pulse programming and the last programming pulse in the second incremental step pulse programming may be the same as the incremental voltage in the third incremental step pulse programming. For example, the voltage of the last programming pulse in the second incremental step pulse programming is P23, and the voltage of the first programming pulse in the third incremental step pulse programming may be P31=P23+(d−s2).

In this implementation, when the programming temperature is within the first temperature ranges, the second incremental step pulse programming is performed on the memory cell with the incremental voltage d−s1 to program the memory cell to the second programmed state, and then the third incremental step pulse programming is performed on the memory cell with a greater incremental voltage d−s2 to program the memory cell to the next programmed state (e.g., the third programmed state) of the second programmed state, thereby improving read margin of the memory cell in the first temperature ranges, reducing read errors, having less overall loss for the performance and reducing the risk of overpgm in the first programmed state.

In some implementations, the method further comprises: performing a third programmed state verification on the memory cell; performing a fourth incremental step pulse programming on the memory cell; wherein, when the programming temperature of the memory cell is within the first temperature ranges, the incremental voltage in the fourth incremental step pulse programming is greater than the incremental voltage in the third incremental step pulse programming and less than the default incremental voltage, or the incremental voltage in the fourth incremental step pulse programming is equal to the incremental voltage in the third incremental step pulse programming.

The third programmed state verification refers to verifying whether the threshold voltage of the memory cell reaches the threshold voltage of the third programmed state. Wherein the threshold voltage of the third programmed state is greater than the threshold voltage of the second programmed state. For example, the second programmed state is the second programmed state L2 in FIG. 4, and the third programmed state is the third programmed state L3 in FIG. 4.

In an implementation, in the third incremental step pulse programming, whenever a programming pulse is applied to a memory cell, a verification voltage may be applied to the memory cell, to verify whether the threshold voltage of the memory cell reaches the threshold voltage of the third programmed state.

In another implementation, in order to further reduce tPROG, in the third incremental step pulse programming, whenever a plurality of programming pulses may be applied to the memory cell, a verification voltage may be applied to the memory cell. Alternatively, as shown in FIG. 10, the verification voltage is not applied to the memory cell during the third incremental step pulse programming ISPP3, but after the last programming pulse in the third incremental step pulse programming ISPP3 is applied to the memory cell, a verification voltage V3 is applied to the memory cell to perform the third programmed state verification on the memory cell to verify whether the threshold voltage of the memory cell reaches the threshold voltage of the third programmed state. Since not all of the memory cells are verified after being applied the programming pulse, the number of programming pulses in the third incremental step pulse programming may be preset, so that the threshold voltage of the memory cell reaches the threshold voltage of the third programmed state after the third incremental step pulse programming is performed on the memory cell.

After the third programmed state verification passes, a fourth incremental step pulse programming is performed on the memory cell. In the fourth incremental step pulse programming, multiple programming pulses are applied to the memory cell in sequence, and the voltage of the latter programming pulse is greater than the voltage of the previous programming pulse. When the programming temperature of the memory cell is within the first temperature ranges, the incremental voltage in the fourth incremental step pulse programming is compensated to reduce the incremental voltage, i.e., the incremental voltage in the fourth incremental step pulse programming is less than the default incremental voltage. For example, the default incremental voltage is d, the compensating voltage is s3 (s2>0), and the incremental voltage in the fourth incremental step pulse programming is d−s3. Wherein s3 may be smaller than s2, i.e., s3<s2, d−s3>d−s2. S3 may also be equal to or approximately equal to s2, i.e., s3=s2, d−s3=d−s2.

For example, as shown in FIG. 10, in the fourth incremental step pulse programming ISPP4 of the memory cell in the first range T1 of temperatures, the voltage of the first programming pulse is P41, the voltage of the second programming pulse is P42=P41+(d−s3), and the voltage of the third programming pulse is P43=P42+(d−s3), and so on until the number of programming pulses reaches the preset number (the preset number is the number of programming pulses preset in the fourth incremental step pulse programming).

Additionally, the voltage difference between the first programming pulse in the fourth incremental step pulse programming and the last programming pulse in the third incremental step pulse programming may be the same as the incremental voltage in the fourth incremental step pulse programming. For example, the voltage of the last programming pulse in the third incremental step pulse programming is P33, and the voltage of the first programming pulse in the fourth incremental step pulse programming may be P41=P33+(d−s3).

It should be noted that after the fourth incremental step pulse programming is performed on the memory cell, the fourth programmed state verification is also performed on the memory cell to verify whether the threshold voltage of the memory cell reaches the threshold voltage of the fourth programmed state. The threshold voltage of the fourth programmed state is greater than the threshold voltage of the third programmed state. After the memory cell passes the fourth programmed state verification, the fifth incremental step pulse programming may also continue to be performed on the memory cell to program the memory cell to another programmed state (e.g., the fifth programmed state). The incremental voltage in the fifth incremental step pulse programming may be equal to the incremental voltage in the fourth incremental step pulse programming, and may also be greater than the incremental voltage in the fourth incremental step pulse programming. In some implementations, the higher the level of the fifth programmed state, the greater the incremental voltage in the fifth incremental step pulse programming.

When the programming of a memory cell includes coarse programming and fine programming, the memory cell is coarsely programmed first, and then finely programmed. Both coarse programming and fine programming are incremental step pulse programming. The incremental voltage in coarse programming may be different from the incremental voltage in fine programming. When the programming temperature is within the first temperature ranges, the incremental voltage of at least one of the coarse programming and the fine programming is a compensated incremental voltage, so as to improve the Margin of the memory cell and reduce the tPROG loss to the greatest extent. Specifically, the incremental voltage of at least one of the second incremental step pulse programming of coarse programming and the second incremental step pulse programming of fine programming is d−s1; the incremental voltage of at least one of the third incremental step pulse programming of coarse programming and the third incremental step pulse programming of fine programming is d−s2; the incremental voltage of at least one of the fourth incremental step pulse programming of coarse programming and the fourth incremental step pulse programming of fine programming is d−s3.

When the programming temperature is within other temperature ranges (i.e., outside the first temperature ranges), in order to further reduce the overall loss for the performance of a memory array, other incremental voltages may be employed to perform incremental step pulse programming on the memory cell.

In some implementations, when the programming temperature of the memory cell is within the preset second temperature ranges, the initial programming voltage of the first incremental step pulse programming is the default programming voltage, and the temperature in the second temperature ranges is higher than the temperature in the first temperature ranges.

Compared with the first temperature ranges, the second temperature ranges has less influence on the programming of the memory cell, i.e., compared with the first temperature ranges, the ESUM of the memory cell programmed in the second temperature ranges is larger. The temperature in the second temperature ranges is higher than the temperature in the first temperature ranges, e.g., the second temperature ranges is from 0° C. to 85° C. etc.

When the programming temperature is within the second temperature ranges, the initial programming voltage in the first incremental step pulse programming may not be compensated, i.e., the initial programming voltage in the first incremental step pulse programming is P11. Additionally, the incremental voltage in the first incremental step pulse programming is the default incremental voltage d.

Figure 11:
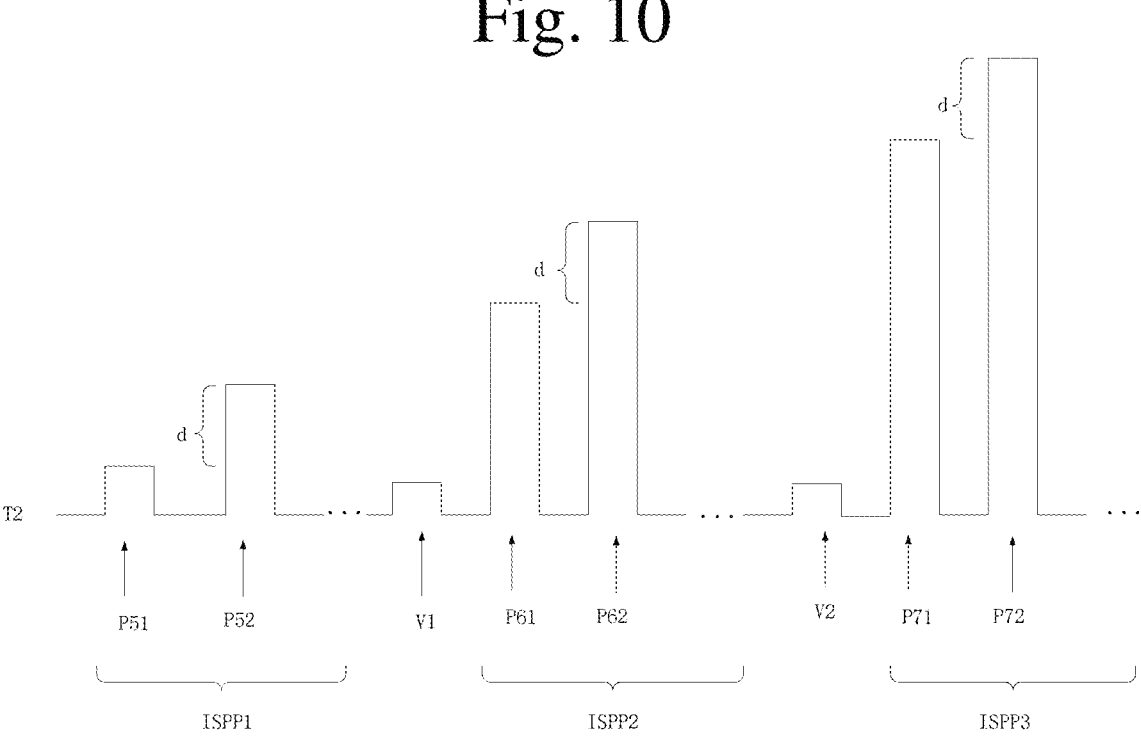
FIG. 11 is yet another schematic diagram of programming pulses in a memory provided by an implementation of the present disclosure.

For example, as shown in FIG. 11, in the first incremental step pulse programming ISPP1 of the memory cell in the second temperature ranges T2, the voltage of the first programming pulse is P51=P0, the voltage of the second programming pulse is P52=P51+d, and the voltage of the third programming pulse is P53=P52+d, and so on until the number of programming pulses reaches the preset number (the preset number is the number of programming pulses preset in the first incremental step pulse programming).

After performing the first incremental step pulse programming ISPP1 on the memory cell, a verification voltage V1 is applied to the memory cell to perform the first programmed state verification on the memory cell.

In some implementations, when the programming temperature of the memory cell is within the preset second temperature ranges, the incremental voltage in the second incremental step pulse programming is the default incremental voltage, and the temperature in the second temperature ranges is higher than the temperature in the first temperature ranges.

After the first programmed state verification passes, a second incremental step pulse programming may be performed on the memory cell. When the programming temperature is within the second temperature ranges, the incremental voltage in the second incremental step pulse programming may not compensated, i.e., the incremental voltage in the second incremental step pulse programming is the default incremental voltage d.

For example, as shown in FIG. 11, in the second incremental step pulse programming ISPP2 of the memory cell in the second temperature ranges T2, the voltage of the first programming pulse is P61, the voltage of the second programming pulse is P62=P61+d, and the voltage of the third programming pulse is P63=P62+d, and so on until the number of programming pulses reaches the preset number (the preset number is the number of programming pulses preset in the second incremental step pulse programming).

If the voltage of the last programming pulse in the first incremental step pulse programming is P53, the voltage of the first programming pulse in the second incremental step pulse programming is P61=P53+d.

After performing the second incremental step pulse programming ISPP2 on the memory cell, a verification voltage V2 is applied to the memory cell to perform the second programmed state verification on the memory cell.

After the second programmed state verification passes, a third incremental step pulse programming may be performed on the memory cell. When the programming temperature is within the second temperature ranges, the incremental voltage in the third incremental step pulse programming may not compensated, i.e., the incremental voltage in the third incremental step pulse programming is the default incremental voltage d.

For example, as shown in FIG. 11, in the third incremental step pulse programming ISPP3 of the memory cell in the second temperature ranges T2, the voltage of the first programming pulse is P71, the voltage of the second programming pulse is P72=P71+d, and the voltage of the third programming pulse is P73=P72+d, and so on until the number of programming pulses reaches the preset number (the preset number is the number of programming pulses preset in the third incremental step pulse programming).

If the voltage of the last programming pulse in the second incremental step pulse programming is P63, the voltage of the first programming pulse in the third incremental step pulse programming is P71=P63+d.

It should be noted that when the programming temperature is within the second temperature ranges, no incremental step pulse programming for other programmed states may compensate the incremental voltage, i.e., the incremental voltage in the incremental step pulse programming for other programmed states may all be the default incremental voltage d.

In some implementations, when the programming temperature is within the first temperature ranges, the higher the level of the programmed state, the smaller the compensation voltage for the programmed state is, so that the incremental voltage in the incremental step pulse programming for this programmed state is larger. When the programming temperature is within the second temperature ranges, the incremental voltage in the incremental step pulse programming is not compensated. As shown in Table 1, when the programming temperature is within the first temperature ranges (e.g., low temperature), the default incremental voltage in the incremental step pulse programming is d, the incremental voltage in the incremental step pulse programming from programmed state L1 to programmed state Li ($i \geq 1$) is d–ΔV1, the incremental voltage in the incremental step pulse programming from programmed state Li+1 to programmed state Lj ($j \geq i+1$) is d–ΔV2, the incremental voltage in the incremental step pulse programming from programmed state Lj+1 to programmed state Lk ($k \geq j+1$) is d–ΔV3, and the incremental voltage in the incremental step pulse programming from programmed state Lk+1 to programmed state Ln ($n \geq k+1$) is d–ΔV4. Wherein ΔV1>ΔV2≥ΔV3≥ΔV4. n is the total number of programmed states, e.g., n=7 for a TLC-type memory cell, and n=15 for a QLC-type memory cell. When the programming temperature is within the second temperature ranges (e.g., normal temperature and high temperature), each of the incremental voltages in the incremental step pulse programming for all programmed states is the default incremental voltage d.

TABLE 1

| temperature | temperature range | L1 – Li | Li + 1 – Lj | Lj + 1 – Lk | Lk + 1 – Ln |
|---|---|---|---|---|---|
| low temperature | first temperature ranges | d-ΔV1 | d-ΔV2 | d-ΔV3 | d-ΔV4 |
| normal temperature high temperature | second temperature ranges | d | d | d | d |

A memory programming method, a memory and a memory system provided by implementations of the present disclosure are able to perform a first incremental step pulse programming on the memory cell; perform a first programmed state verification on the memory cell; perform a second incremental step pulse programming on the memory cell, and when the programming temperature of the memory cell is within the preset first temperature ranges, the incremental voltage in the second incremental step pulse programming is less than a default incremental voltage, so as to adjust programming speed of the memory cell in the first temperature ranges, improve read margin of the memory cell in the first temperature ranges, reduce read errors, and have less overall loss for the performance, thereby improving reliability of product.

Accordingly, memories in implementations of the present disclosure may implement the memory programming method described above.

As shown in FIG. 1, the memory provided by the implementation of the present disclosure includes a memory array 1 and a peripheral circuit 2 coupled to the memory array 1. The memory array 1 includes a plurality of memory cells 12 coupled to the peripheral circuit 2. The peripheral circuit 2 is configured to: perform a first incremental step pulse programming on the memory cell; perform a first programmed state verification on the memory cell; perform a second incremental step pulse programming on the memory cell; wherein, when the programming temperature of the memory cell is within the preset first temperature ranges, the incremental voltage in the second incremental step pulse programming is less than a default incremental voltage.

In some implementations, the incremental voltage in the first incremental step pulse programming is the default incremental voltage.

In some implementations, the peripheral circuit 2 is further configured to: perform a second programmed state verification on the memory cell; perform a third incremental step pulse programming on the memory cell; wherein, when the programming temperature of the memory cell is within the first temperature ranges, the incremental voltage in the third incremental step pulse programming is greater than the incremental voltage in the second incremental step pulse programming and less than the default incremental voltage.

In some implementations, the threshold voltage of the second programmed state is greater than the threshold voltage of the first programmed state.

In some implementations, the peripheral circuit 2 is further configured to: perform a third programmed state verification on the memory cell; perform a fourth incremental step pulse programming on the memory cell; wherein, when the programming temperature of the memory cell is within the first temperature ranges, the incremental voltage in the fourth incremental step pulse programming is greater than the incremental voltage in the third incremental step pulse programming and less than the default incremental voltage, or the incremental voltage in the fourth incremental step pulse programming is equal to the incremental voltage in the third incremental step pulse programming.

In some implementations, the threshold voltage of the third programmed state is greater than the threshold voltage of the second programmed state.

In some implementations, when the programming temperature of the memory cell is within the preset second temperature ranges, the incremental voltage in the second incremental step pulse programming is the default incremental voltage, and the temperature in the second temperature ranges is higher than the temperature in the first temperature ranges.

In some implementations, when the programming temperature of the memory cell is within the first temperature ranges, the initial programming voltage of the first incremental step pulse programming is greater than the default programming voltage.

In some implementations, when the programming temperature of the memory cell is within the preset second temperature ranges, the initial programming voltage of the first incremental step pulse programming is the default programming voltage, and the temperature in the second temperature ranges is higher than the temperature in the first temperature ranges.

Figure 12:
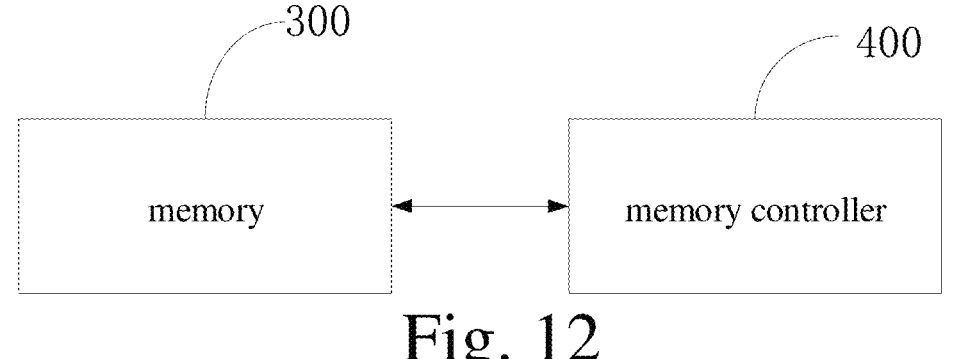
FIG. 12 is a schematic structural diagram of a memory system provided by an implementation of the present disclosure.

Referring to FIG. 12, it is a schematic structural diagram of a memory system provided by an implementation of the present disclosure.

As shown in FIG. 12, an implementation of the present disclosure also provides a memory system, which includes a memory 300 and a memory controller 400 coupled to the memory controller 400, the memory controller 400 is used to control the memory 300 to store data. The memory 300 is a memory in the implementations described above, and will not be described in detail here. The memory controller 400 may be a controller well known to those skilled in the art, and will not be described in detail here.

Figure 13:
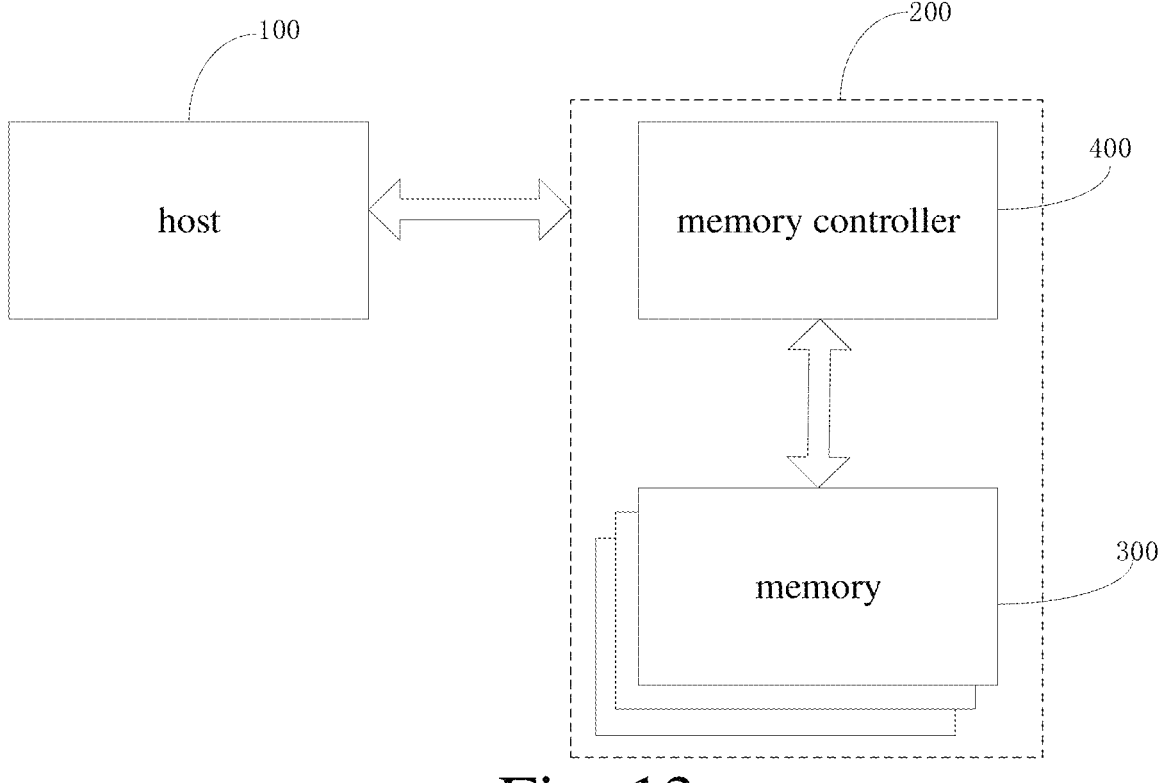
FIG. 13 is a schematic structural diagram of a system with a memory provided by an implementation of the present disclosure.

Referring to FIG. 13, it is a schematic structural diagram of a system with a memory provided by an implementation of the present disclosure.

As shown in FIG. 13, the system may be a mobile phone, a desktop computer, a laptop computer, or any other suitable electronic device with a memory. As shown in FIG. 13, the system may include a host 100 and a memory system 200 having one or more memories 300 and a memory controller 400. The host 100 may be configured to send data to or receive data from memory 300.

Memory 300 may be any apparatus disclosed in this disclosure. The memory controller 400 is coupled to the memory 300 and the host 100, and is configured to control the memory 300. The memory controller 400 may manage data stored in the memory 300 and communicate with the host 100.

The memory controller 400 may be configured to control operations of the memory 300, e.g., reading, erasing, and program operations. The memory controller 400 may be configured to manage various functions related to data stored or to be stored in memory 300, including but not limited to bad block management, garbage collection, logical-to-physical address translation, wear leveling, etc. In some implementations, the memory controller 400 is further configured to process error correction code (ECC) on data read from or written to memory 300. The memory controller 400 perform any other suitable functions, e.g., formatting memory 300. The memory controller 400 may communicate with external devices (e.g., host 100) according to a particular communication protocol. For example, the memory controller 400 may communicate with external devices through at least one of various interface protocols, such as USB protocol, Multimedia Card (MMC) protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 400 and one or more memories 300 may be integrated into various types of storage apparatus, e.g., included in the same package (e.g., Universal Flash Storage (UFS) package or eMMC package). That is, memory system 200 may be implemented and packaged into different types of end electronic products.

In summary, although the present disclosure has been disclosed above with preferred implementations, the preferred implementations described above are not intended to limit the present disclosure, and those of ordinary skill in the art can make various modifications without departing from the spirit and scope of the present disclosure, therefore, the protected scope of the present disclosure shall be determined by the scope defined in the claims.

What is claimed is:

1. A method for programming a memory device comprising a plurality of memory cells, the method comprising:

in response to a programming temperature of the memory cells being within a first temperature range, performing following operations during a time period in which the programming temperature is within the first temperature range:

performing a first incremental step pulse programming on the memory cells, a first incremental voltage in the first incremental step pulse programming being less than a default incremental voltage, an initial programming voltage of the first incremental step pulse programming being greater than a default initial programming voltage;

performing a verification of a first programmed state on the memory cells;

performing a second incremental step pulse programming on the memory cells, a second incremental voltage in the second incremental step pulse programming being greater than the first incremental voltage and less than the default incremental voltage; and performing a verification of a second programmed state on the memory cells, a second threshold voltage of the second programmed state being greater than a first threshold voltage of the first programmed state.

2. The method of claim 1, further comprising:

in response to the programming temperature of the memory cells being within the first temperature range, further performing the following:

performing a third incremental step pulse programming on the memory cells, a third incremental voltage in the third incremental step pulse programming being greater than the second incremental voltage and less than the default incremental voltage; and performing a verification of a third programmed state on the memory cells, a third threshold voltage of the third programmed state being greater than the second threshold voltage of the second programmed state.

3. The method of claim 2, the method further comprising:

in response to the programming temperature of the memory cells being within the first temperature range, further performing the following:

performing a fourth incremental step pulse programming on the memory cells, a fourth incremental voltage in the fourth incremental step pulse programming being greater than or equal to the third incremental voltage and less than the default incremental voltage; and performing a verification of a fourth programmed state on the memory cells, a fourth threshold voltage of the fourth programmed state being greater than the third threshold voltage of the third programmed state.

4. The method of claim 1, further comprising:

in response to the programming temperature of the memory cells being within a second temperature range higher than the first temperature range, determining the second incremental voltage in the second incremental step pulse programming being equal to the default incremental voltage.

5. The method of claim 1, further comprising:

in response to the programming temperature of the memory cells being within a second temperature range higher than the first temperature range, determining the first incremental voltage in the first incremental step pulse programming being equal to the default incremental voltage.

6. A memory device, comprising:

a plurality of memory cells; and a peripheral circuit coupled to the plurality of memory cells and configured to:

in response to a programming temperature of the memory cells being within a first temperature range, perform following operations during a time period in which the programming temperature is within the first temperature range:

performing a first incremental step pulse programming on the memory cells, a first incremental voltage in the first incremental step pulse programming being less than a default incremental voltage, an initial programming voltage of the first incremental step pulse programming being greater than a default initial programming voltage, performing a verification of a first programmed state on the memory cells, performing a second incremental step pulse programming on the memory cells, a second incremental voltage in the second incremental step pulse programming being greater than the first incremental voltage and less than the default incremental voltage, and performing a verification of a second programmed state on the memory cells, a second threshold voltage of the second programmed state being greater than a first threshold voltage of the first programmed state.

7. The memory device of claim 6, wherein the peripheral circuit is further configured to:

in response to the programming temperature of the memory cells being within the first temperature range, further perform the following:

performing a third incremental step pulse programming on the memory cells, a third incremental voltage in the third incremental step pulse programming being greater than the second incremental voltage and less than the default incremental voltage; and performing a verification of a third programmed state on the memory cells, a third threshold voltage of the third programmed state being greater than the second threshold voltage of the second programmed state.

8. The memory device of claim 7, wherein the peripheral circuit is further configured to:

in response to the programming temperature of the memory cells being within the first temperature range, further perform the following:

performing a fourth incremental step pulse programming on the memory cells, a fourth incremental voltage in the fourth incremental step pulse programming being greater than or equal to the third incremental voltage and less than the default incremental voltage; and performing a verification of a fourth programmed state on the memory cells, a fourth threshold voltage of the fourth programmed state being greater than the third threshold voltage of the third programmed state.

9. The memory device of claim 6, wherein the peripheral circuit is further configured to:

in response to the programming temperature of the memory cells being within a second temperature range higher than the first temperature range, determine the second incremental voltage in the second incremental step pulse programming being equal to the default incremental voltage.

10. The memory device of claim 6, wherein the peripheral circuit is further configured to:

in response to the programming temperature of the memory cells being within a second temperature range higher than the first temperature range, determine the first incremental voltage in the first incremental step pulse programming being equal to the default incremental voltage.

11. A memory system, comprising:

a memory device, comprising:

a plurality of memory cells; and a peripheral circuit coupled to the plurality of memory cells and configured to:

in response to a programming temperature of the memory cells being within a first temperature range, perform following operations during a time period in which the programming temperature is within the first temperature range:

performing a first incremental step pulse programming on the memory cells, a first incremental voltage in the first incremental step pulse programming being less than a default incremental voltage, an initial programming voltage of the first incremental step pulse programming is greater than a default initial programming voltage, performing a verification of a first programmed state on the memory cells, performing a second incremental step pulse programming on the memory cells, a second incremental voltage in the second incremental step pulse programming being greater than the first incremental voltage and less than the default incremental voltage, and performing a verification of a second programmed state on the memory cells, a second threshold voltage of the second programmed state being greater than a first threshold voltage of the first programmed state; and a memory controller coupled to the memory device and configured to control the memory device through the peripheral circuit.

12. The memory system of claim 11, wherein the peripheral circuit is further configured to:

in response to the programming temperature of the memory cells being within a second temperature range higher than the first temperature range, determine the second incremental voltage in the second incremental step pulse programming being equal to the default incremental voltage.

13. The memory system of claim 11, wherein the peripheral circuit is further configured to:

in response to the programming temperature of the memory cells being within the first temperature range, further perform the following:

performing a third incremental step pulse programming on the memory cells, a third incremental voltage in the third incremental step pulse programming being greater than the second incremental voltage and less than the default incremental voltage; and performing a verification of a third programmed state on the memory cells, a third threshold voltage of the third programmed state being greater than the second threshold voltage of the second programmed state.

14. The memory system of claim 13, wherein the peripheral circuit is further configured to:

in response to the programming temperature of the memory cells being within the first temperature range, further perform the following:

performing a fourth incremental step pulse programming on the memory cells, a fourth incremental voltage in the fourth incremental step pulse programming being greater than or equal to the third incremental voltage and less than the default incremental voltage; and performing a verification of a fourth programmed state on the memory cells, a fourth threshold voltage of the fourth programmed state being greater than the third threshold voltage of the third programmed state.

15. The memory system of claim 14, wherein the peripheral circuit is further configured to:

in response to the programming temperature of the memory cells being within a second temperature range higher than the first temperature range, determine the first incremental voltage in the first incremental step pulse programming being equal to the default incremental voltage.

* * * * *